United States Patent
Kemp et al.

(10) Patent No.: US 10,244,067 B1
(45) Date of Patent: *Mar. 26, 2019

(54) WEB SERVICE GATEWAY

(71) Applicant: STATE FARM MUTUAL AUTOMOBILE INSURANCE COMPANY, Bloomington, IL (US)

(72) Inventors: Bradley David Kemp, Bloomington, IL (US); Larry Gregory Turilli, Bloomington, IL (US); Tracey Ann Boll, Bloomington, IL (US); Matthew Stephen Ayers, Peoria, IL (US)

(73) Assignee: State Farm Mutal Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/938,072

(22) Filed: Mar. 28, 2018

Related U.S. Application Data

(63) Continuation of application No. 14/690,925, filed on Apr. 20, 2015, now Pat. No. 9,961,154.

(60) Provisional application No. 61/985,404, filed on Apr. 28, 2014.

(51) Int. Cl.
 *G06F 9/54* (2006.01)
 *H04L 29/08* (2006.01)
(52) U.S. Cl.
 CPC .............. *H04L 67/28* (2013.01); *H04L 67/02* (2013.01); *G06F 9/541* (2013.01)
(58) Field of Classification Search
 CPC .......... H04L 67/02; H04L 67/28; G06F 9/541

USPC ......................................................... 709/219
See application file for complete search history.

(56) References Cited

U.S. PATENT DOCUMENTS

| | | | |
|---|---|---|---|
| 5,893,906 | A | 4/1999 | Daffin et al. |
| 9,182,989 | B1 | 11/2015 | Bokka |
| 9,961,154 | B1 * | 5/2018 | Kemp ................. H04L 67/28 |
| 2006/0041862 | A1 | 2/2006 | Moussallam et al. |
| 2007/0055678 | A1 | 3/2007 | Fung et al. |
| 2007/0073771 | A1 | 3/2007 | Baikov et al. |
| 2014/0013337 | A1 | 1/2014 | Neft |
| 2014/0047408 | A1 | 2/2014 | Jesurum |

(Continued)

OTHER PUBLICATIONS

Marshall, Pointers, Jan. 5, 1999, https://users.cs.cf.ac.uk/Dave.Marshall/C/node10.html.

*Primary Examiner* — James E Springer

(57) ABSTRACT

A web service gateway system includes a host application execution environment including one or more processors, a memory, and a gateway interface configured to receive a gateway copybook input from a host application. The gateway copybook includes input data including a pointer identifying a memory location of a request structure copybook, and output data including a pointer identifying a memory location of a response structure copybook. A gateway program receives the gateway copybook from the gateway interface and invokes a proxy web service with a request using the request structure copybook. The proxy web service maps data from the request structure copybook to web protocol format data, and invokes a target web service with the web protocol format data. The gateway program returns to the gateway interface a response that is based upon a response the gateway program receives from the proxy web service and uses the response structure copybook.

20 Claims, 7 Drawing Sheets

(56) References Cited

U.S. PATENT DOCUMENTS

2017/0123865 A1   5/2017   Wang et al.

* cited by examiner

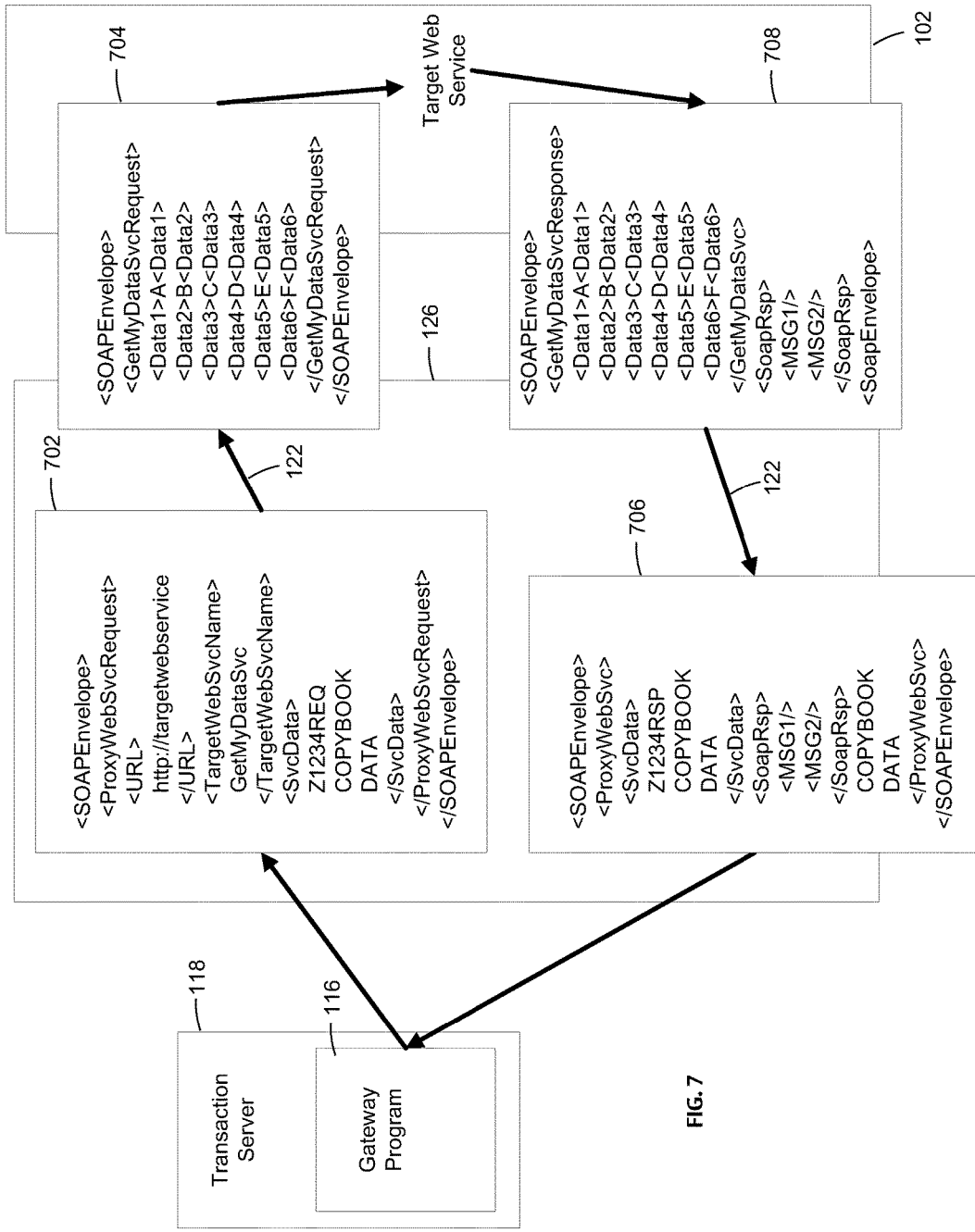

WEB SERVICE GATEWAY

CROSS-REFERENCE TO RELATED APPLICATIONS

This is a continuation of U.S. patent application Ser. No. 14/690,925, entitled "Web Service Gateway" and filed on Apr. 20, 2015, which claims the benefit of U.S. Patent Application No. 61/985,404, filed Apr. 28, 2014. The disclosures of the above-identified applications are hereby incorporated herein in their entireties.

FIELD OF THE INVENTION

The present invention relates to service gateways, and, more particularly, to a web service gateway that supplies host applications with seamless access to web service application interfaces (APIs).

BACKGROUND OF THE INVENTION

Many computing environments, especially those found in corporate or governmental organizations, include host applications running on mainframe systems, for example, IBM's z/OS operating system. These organizations often rely on mainframe host applications to run critical applications and bulk data processing, and often maintain teams of host application developers who specialize in writing programs for these platforms. Common mainframe host applications can be run in either batch or online mode, and are written in languages such as COBOL, PL/I, C/C++, Assembler, Java, CLIST, REXX, or others such as DB/2 stored procedures.

Increasingly, computing environments of all types seek to utilize resources or services made available according to the service-oriented architecture (SOA) model. The SOA model is a software design and software architecture design pattern based upon discrete pieces of software providing application functionality as services to other applications. These services are sometimes provided over a network, thus facilitating the cooperation of computers and applications with network access. According to the web service SOA model, every computer in the network can run an arbitrary number of web services, and each web service may be built in a way that ensures that the service can exchange information with any other service in the network. If an SOA model is implemented over standard internet protocols, it is often termed a web service. Web service providers and clients communicate according to open protocols, sometimes termed service standards or web service specifications, which allow them to be used independently of platforms and programming languages, and without human intervention. Examples of common protocols include Representational State Transfer (REST), Simple Object Access Protocol (SOAP), JavaScript Object Notation Web-Service Protocol (JSON-WSP), Extensible Markup Language (XML) and others. The web services are defined by a Web Services Description Language (WSDL), an XML-based interface description language that is used for describing the functionality offered by a web service. The WSDL describes services as collections of network endpoints or ports. The WSDL specifications provide an XML format for documents for this purpose (called a WSDL file) wherein the abstract definitions of ports and messages are separated from their concrete use or instance. To be a web service client, an application must be capable of performing certain tasks required by the nature of internet communications and the web service protocols, including, for example, native sockets programming, string manipulation, and XML parsing.

Increasingly, existing host programs seek access to information that is best accessed via, or possibly only accessible via, SOA services. Adapting existing host programs to use SOA services presents several difficulties. The host programs are often maintained by developers or teams of developers with traditional host developer skillsets. These host developers are likely to encounter a variety of difficulties in adapting host programs to use SOA services because of a mismatch between the common types of problems and architecture between the two environments. Unlike in host systems, SOA services no longer entail one discrete program natively or dynamically "calling" another program. Instead, the target service in an SOA service is always on another computer. There is always a network and a network communication involved in SOA web services. There are likely to be multiple environments in SOA services such as a production environment and multiple test environments. SOA services may exist on multiple execution domains, or the same target service may even exist multiple times in the same execution domain. Host developers are likely to encounter difficulties in view of the foregoing challenges when trying to route SOA requests to the correct instance of a target service. To do so successfully would require these developers to have a substantial knowledge of the network naming conventions, to keep up with changes to target services in multiple test environments, and to imbed infrastructure logic in their host applications, which may be undesirable generally because it introduces a lack of portability into the applications and diminishes their robustness.

Adapting host programs to use SOA services also implicates a variety of security issues. When invoking SOA services, it is preferable not to pass user credentials, but rather to secure target services using ProcessID credentials. Requester credentials may be authenticated by a Resource Access Control Facility (RACF), and target service ProcessID credentials may be authenticated according to the Lightweight Directory Access Protocol (LDAP) using Basic Authorization Credentials (BAC) in the HTTP request header. Further tangling the security is that different instances of the same target service are likely to have separate credentials, and those credentials may change over time. These security and authorization safeguards introduce an additional level of complexity to the host application that is often difficult to manage in an organized, disciplined, and efficient fashion.

Even under optimistic assumptions of developer skill and dedication to the task, training these programmers to develop the necessary skills is expensive and time-consuming. To do so would likely require a large degree of trial-and-error development as the host application teams experiment with the SOA web services and interfaces to achieve an acceptable level of service. This approach may involve an unacceptably high risk of complete failures in the event the developers are unable to master the requisite skills and successfully incorporate the SOA services into the host application. If there are multiple host development teams, as is common in large enterprise or corporate environments, then it is likely that these teams would incur a large degree of duplication of effort, and ultimately arrive at multiple one-off solutions unique to each team and incompatible with one another.

Even if host developer teams are able to incorporate SOA web client functionality into their applications, the APIs commonly available to host applications to enable SOA client access have several drawbacks, if they are even available at all, and are thus ill-suited for this purpose. Batch jobs and DB2 stored procedures, two common environments in which host applications execute, have no high level APIs suitable for SOA client communications. Other host application environments such as CICS or IMS have the WEB-SERVICE interface and the ICAL interface using IMS Connect and IMS Soap Gateway, respectively, but use of these APIs is limited to the corresponding execution environment The only common API across all execution environments is native sockets programming, which is complicated, and requires networking protocols that are difficult to learn, and string manipulation and XML programming in host applications. This is not a common skill among host programmers.

All of these issues are problematic when encountered by traditional host developers. Moreover, even if an organization does successfully implement SOA client code in its host programs, it will experience low code reusability, slow development, and error-prone host applications that must be addressed by programmers familiar with that particular host application. Overall, this approach presents a development environment that is far from ideal for the incorporation of SOA web services into host applications.

SUMMARY OF THE INVENTION

The web service gateway disclosed herein is an enterprise infrastructure component that provides a single web service API to host applications for accessing any web service.

Aspects of the web service gateway may include: that it has a single API available across all host execution environments, it does not require significant new training of existing host application developers, it uses simple, low-cost additions to existing infrastructure for each target SOA web service, and it handles target service addresses and security credentials outside the application source by managing the addresses and credentials as configuration data in the enterprise infrastructure rather than within the host application source. The web service gateway supports multiple execution domains and multiple test environments.

In one embodiment, the web service gateway utilizes a transaction server to assist with transaction processing, such as the Customer Information Control System (CICS) or IMS (Information Management System), both produced by IBM Corp. The transaction server executes a gateway program that permits the host applications to submit request data by dynamically or natively calling a gateway interface program in the same way a host application would traditionally call another program. The transaction processor moves any request received from a host application to the appropriate transaction server gateway system where there is an existing web service API. The transaction server handles any errors that can occur on a web service request, and returns only the results to the calling host application. The transaction processor need only implement one requester web service that invokes a proxy web service running on an SOA appliance, such as, for example, the IBM WebSphere DataPower SOA appliance. In this configuration, all host application requests flow through the same transaction server web service, request and response data flows as a single variable length character string, and all host systems have the same configuration settings for client participation in any SOA web service.

For each target web service supported by the SOA appliance, the web service gateway registers a unique URL that delivers the transaction server's web service request to the SOA appliance proxy web service. The host application submits data requests and receives response data in the form of copybooks or record formats populated with typed variables and/or pointers to other copybooks or record formats. These copybooks are mapped into the necessary web service protocol formats, for example SOAP, for submission to the web server via the proxy web service, and are translated back to copybook format for delivery to the calling host applications. The request copybooks contain all information necessary to complete the SOA web service requests, including the web service server, endpoint, and any necessary parameters. The response copybooks contain the response from the SOA web service as well as additional metadata supplied by the web service gateway. The web service gateway returns any error messages or error codes received from the web service API to the invoking application regardless of where they occur. The web service gateway also returns its own set of error codes to the calling application.

The present embodiments as disclosed herein may enable an organization with skilled host application programmers to leverage a simple pattern for invoking SOA web services consistently throughout all host applications using a familiar API. The present embodiments may allow for flexibility by handling differences across execution domains outside the source code, thereby freeing the developers from a requirement of network topology knowledge. The present embodiments may also provide for secure communications, and need only a small incremental addition of infrastructure hardware for most existing enterprise computing environments.

In one aspect, a computer-implemented web service gateway system comprises a host application execution environment including one or more processors, a memory configured to store and execute one or more host applications, and a gateway interface configured to receive a gateway copybook input from one of the host applications. The gateway copybook includes at least (1) input data including a pointer identifying a memory location where a request structure copybook resides, and (2) output data including a pointer identifying a memory location where a response structure copybook resides. A gateway program is configured to receive the gateway copybook from the gateway interface via a network and to invoke a proxy web service with a request using the request structure copybook. The proxy web service is configured to map data from the request structure copybook to web protocol format data. The proxy web service is configured to invoke a target web service with the web protocol format data. The gateway program is further configured to return a response to the gateway interface. The response to the gateway interface is based upon a response that (1) the gateway program receives from the proxy web service, and (2) uses the response structure copybook.

In another aspect, a computer-implemented method for managing host application web service client requests includes: (1) natively calling a gateway interface from a host application; (2) submitting target web service request data in a request structure copybook to a gateway interface via a pointer in a gateway copybook to the request structure copybook, wherein the gateway copybook includes at least: (a) input data including the pointer to the request structure copybook, the pointer to the request structure copybook identifying a memory location where the request structure copybook resides; and (b) output data including a pointer identifying a memory location where a response structure copybook resides; (3) transferring, via a network, the gateway copybook from the gateway interface to a gateway program executing on a transaction server; (4) mapping, via a proxy web service, the target web service data into web service protocol format; (5) submitting target web service request data according to the web service protocol format to a target web service to facilitate managing host application web service client requests; and (6) returning a response from the gateway program to the gateway interface, the response to the gateway interface being based upon a response that (a) the gateway program receives from the proxy web service, and (b) uses the response structure codebook.

BRIEF DESCRIPTION OF THE DRAWINGS

For a more complete understanding of the disclosure, reference should be made to the following detailed description and accompanying drawing figures, in which like reference numerals identify like elements in the figures, and in which:

FIG. 7 is a diagram showing the conversion of web protocol data in accordance with the present embodiments.

Figure 1:
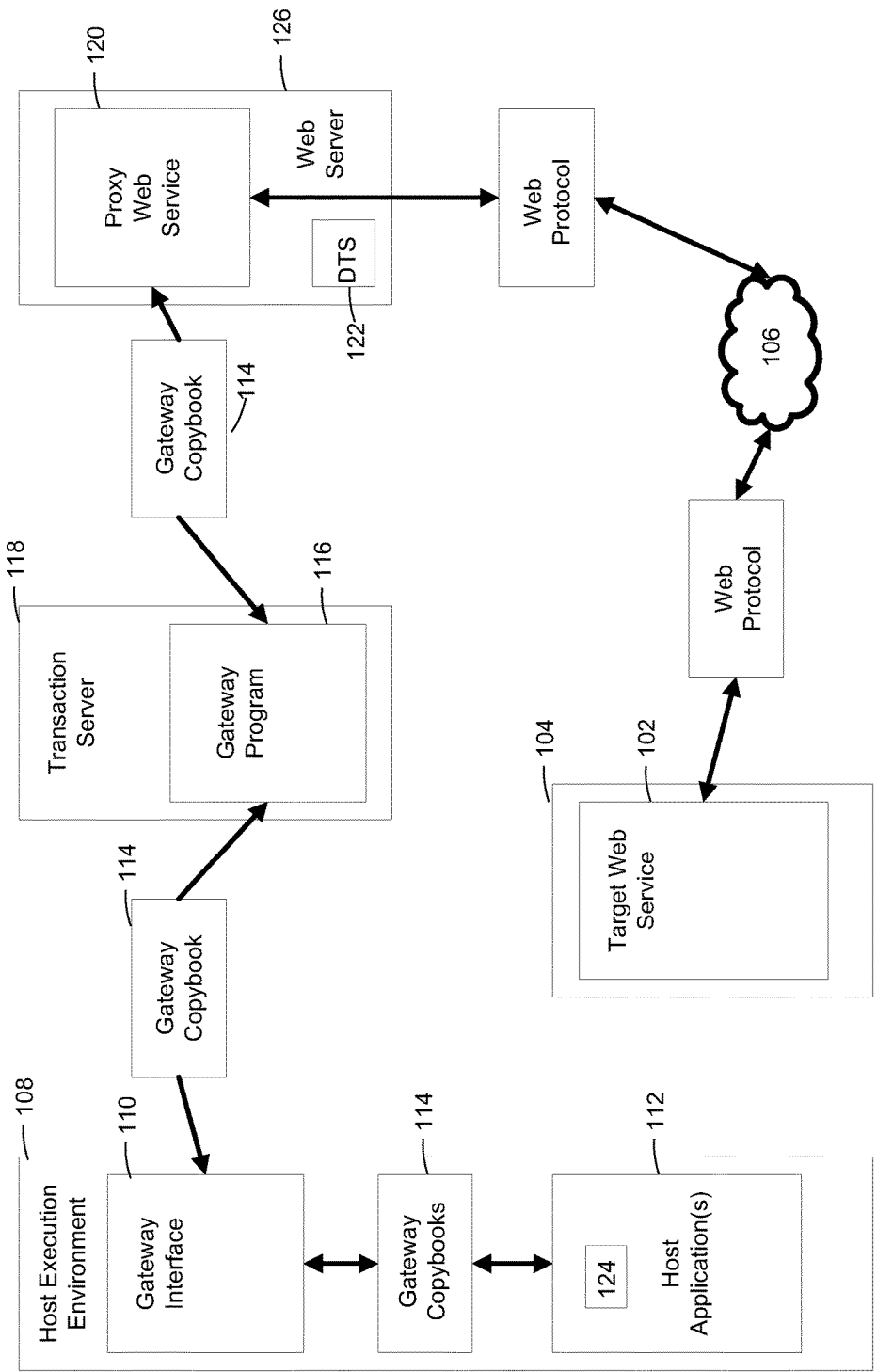
FIG. 1 is a diagram showing an example architecture of the web service gateway.

While the disclosed methods and apparatuses are susceptible of embodiments in various forms, there are illustrated in the drawings (and will hereafter be described) specific embodiments of the invention, with the understanding that the disclosure is intended to be illustrative, and is not intended to limit the invention to the specific embodiments described and illustrated herein.

DETAILED DESCRIPTION OF THE DRAWINGS

The present embodiments may provide, inter alia, a web service gateway that provides a single web service API to host applications for accessing any web service. The single web service API may be available across all host execution environments. The single web service API may facilitate client service by handling target service addresses and security credentials, and/or avoid significant new training for existing host application developers. The web service gateway may support multiple execution domains and multiple test environments. The present embodiments may also (1) enable an organization with skilled host application programmers to leverage a simple pattern for invoking SOA web services consistently throughout all host applications using a familiar API; (2) allow for flexibility by handling differences across execution domains outside the source code, thereby freeing the developers from a requirement of network topology knowledge; and/or (3) provide secure communications, and add only limited incremental infrastructure hardware to most existing enterprise computing environments.

I. Exemplary Web Service Gateway

Referring now to FIG. 1, an embodiment of the invention is shown illustrating a high-level overview of the constituent components of web service gateway 100, including a target web service 102 running on remote server 104 communicatively coupled to public or private network 106. Web service gateway 100 includes host application execution environment 108, which provides a platform for execution of any type of applications 112 that seek to be clients of target web service 102 such as, for example, a batch job, IMS, PL/I, or COBOL application, DB2 stored procedure, or any other program or script executable in the host environment. Host application execution environment 108 also provides a platform for execution of gateway interface 110 that may be natively or dynamically called by host application(s) 112. Application(s) 112 contain gateway copybooks 114, described in more detail below with respect to FIG. 6, that contain data necessary to make the desired web service requests and to accept responses thereto, including parameters to control the behavior of web service gateway 100.

Gateway interface 110 is communicatively coupled to gateway program 116 via a network. Transaction server 118 may be a CICS or IMS transaction server, as described above, or any other transaction server capable of fulfilling the role described herein. In an embodiment, host applications 112 may also execute on transaction server 118 in addition to or instead of on host application execution environment 108. Gateway interface 110 may likewise execute on transaction server 118 in addition to or instead of on host application execution environment 108. Host applications 112 may call gateway interface 110 on transaction server 118, in the same way host applications 112 and gateway interface 110 interact on host application execution environment 108.

Web service gateway 100 also includes web proxy server 120 executing on web server 126. Web proxy server 120 is configured to execute data translation service 122, as described in more detail below with reference to FIG. 6 and is communicatively coupled to gateway program 116 on transaction server 118. FIG. 1 depicts target web service 102, available on remote server 104. Remote server 104 may be located anywhere on any network location that is accessible to proxy web service 120 via public or private network 106. Remote server 104 is equipped with the ability to receive and respond to HyperText Transfer Protocol (HTTP) requests received via public or private network 106.

Gateway copybooks 114 contain information supplied by applications 112 needed to submit requests to, and receive responses from, target web service 102. Information contained in copybooks 114 may include data needed to identify the target web service 102 and parameters associated with service requests thereto, as described in more detail below with respect to FIG. 6.

In one embodiment, host applications 112 contain message area 124 for display of return codes to convey status information on requests to target web service 102. The return codes are not the return codes from the target web service 102 itself, but rather from the gateway interface 110 or gateway program 116. These codes indicate whether web service gateway 100 was successful in submitting host application 112's web service request, or, if not, a code representing the failure. A successful return code in message area 124 does not necessarily indicate a successful response from target web service 102. Table 1 below provides examples of return codes for display in message area 124.

| Return Code | Status |
|---|---|
| 0 | Successful Proxy Web Service request |
| 4 | Successful call, application data returned, but truncated |
| 8 | Web service protocol fault returned |
| 12 | Gateway copybook parameter error |
| 16 | Communications/Socket failure |
| 20 | Unrecoverable error |

Continuing to refer to Table 1, return code 0, indicating a successful proxy web service request may be indicated by a blank message area 124, and, as stated above, does not apply to the target web service request itself because this information is application specific. Return code 4, Successful Call, indicates the actual response length exceeds the length specified by the host application 124 in gateway copybook 114. Return code 8, web service protocol fault returned, is displayed in message area 124 to state that there was a web service fault data in the response, and message area 124 may contain the unparsed web service protocol fault message in Extensible Markup Language (XML). Return code 12, gateway copybook parameter error, is indicated when a gateway copybook parameter is missing or invalid. Message area 124 may explain the gateway copybook parameter error, and that the target web service 124 was not invoked on this request. Return code 16, communications/socket failure, causes message area 124 to display debug details. Finally, return code 20, unrecoverable error, may cause message area 124 to display debug or console output. Other return codes familiar to persons skilled in the art may be added, or the return codes referred to herein may be modified according to techniques known in the art to supply additional debug or console output or to indicate further success or failure states of the web service gateway 100 or target web service 102.

II. Exemplary Web Service Gateway Operation

Figure 2:
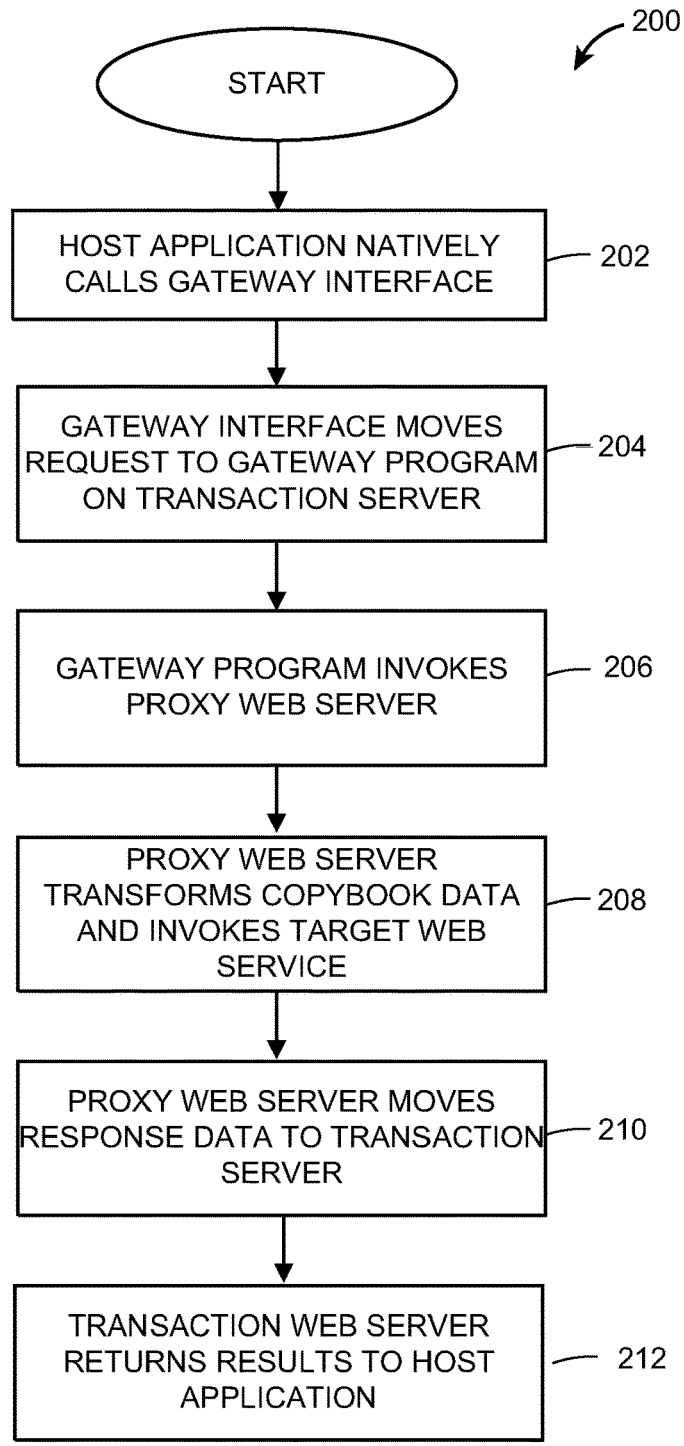
FIG. 2 is a flow chart illustrating a method for requesting a web service and returning a response in accordance with the present embodiments.

Referring now to FIG. 2, a method 200 of operating web service gateway 100 is illustrated in accordance with the present embodiments. At block 202, host application(s) 112 dynamically call gateway interface 110. At block 204, gateway interface 110 receives gateway copybook 114 with a pointer to request data from host application(s) 112, and transmits them over a network to gateway program 116 on transaction server 118. At block 206, gateway program 116 invokes proxy web service 120, and transmits gateway copybook 114. At block 208, data translation process 122 on proxy web service 120 translates copybook 114 data into web service protocol data and proxy web service 120 transmits the web service protocol data via public or private network 106 to target web service 102. At block 210, proxy web service 120 receives web protocol response data from target web service 102, data translation service 122 transforms it into copybook 114, and proxy web service 120 transmits copybook 114 to gateway program 116. At block 212, gateway program 116 returns response data in copybook 114 to host application 112 via gateway interface program 110. The method may include additional, less, or alternate actions, including those discussed elsewhere herein.

III. Exemplary Gateway Interface Operation

Figure 3:
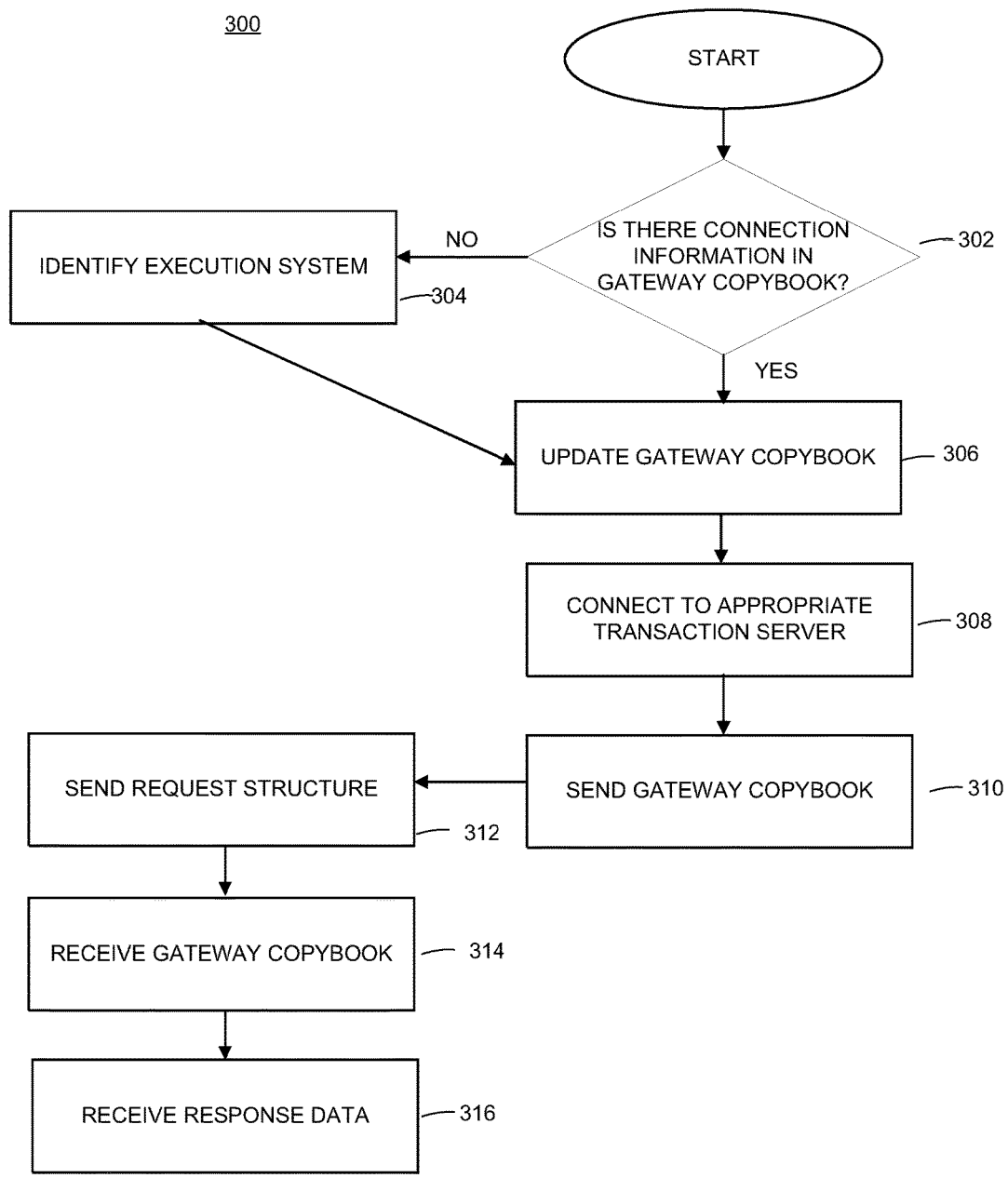
FIG. 3 is a flow chart illustrating a method of operating a gateway interface in accordance with the present embodiments.

Referring now to FIG. 3, a method 300 of operation of a gateway interface 110 is illustrated in accordance with the present embodiments. At block 302, the gateway interface checks the gateway copybook for connection information to a transaction server 118 after receiving it from gateway interface 110. If not, the gateway interface identifies the execution system of host execution environment 108 at block 304. Any given host execution environment 108 may comprise any one of a number of different central processing units (CPUs) or named systems, as it is not uncommon for an enterprise environment to employ more than one type of host execution environment. The gateway interface's identification of a particular host execution environment by name or type indicates a local area of which that system is a part. If the gateway interface's check of gateway copybook 114 for transaction server connection information at block 204 does not reveal connection information, gateway interface 110 may rely on the execution system identified in block 302 to locate a transaction server local to the host execution environment 108 to reduce network connectivity delays.

At block 306, gateway interface 110 updates gateway copybook with transaction server connection information, if needed, as well as the name of target web service 102, target operation name, and target service URL, and connects in block 308. If gateway copybook 114 does contain connection information, gateway interface proceeds to connection at block 308. Gateway interface then sends gateway copybook 114, which has pointers to request structure and response structure, as described in more detail below with reference to FIG. 6, to gateway program 116 on transaction server 118 at blocks 310 and 312, respectively. After the response has been received from target web service 102 via proxy web service 120, gateway interface 110 receives gateway copybook 114 and response data at blocks 314 and 316, respectively. The method may include additional, less, or alternate functionality, including that discussed elsewhere herein.

IV. Exemplary Transaction Server Operation

Figure 4:
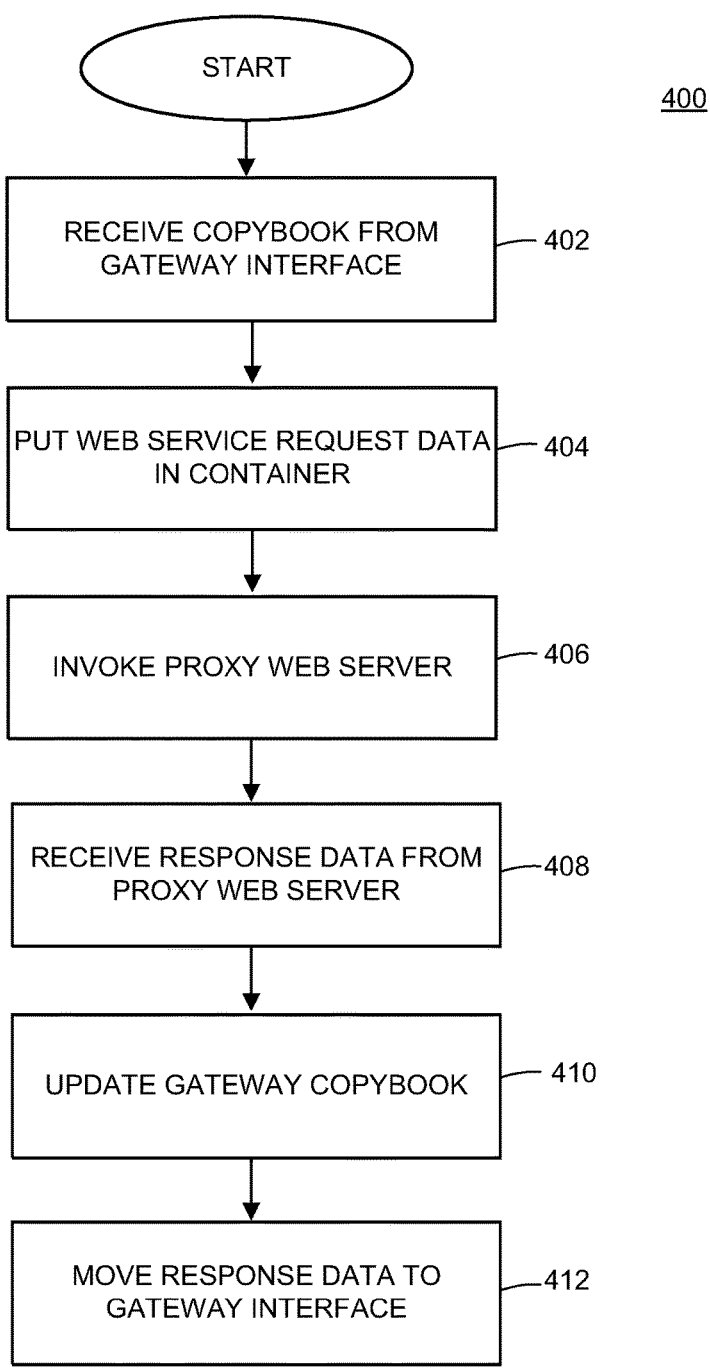
FIG. 4 is a flow chart illustrating a method of operating a transaction server in accordance with the present embodiments.

FIG. 4 illustrates a method 400 of operation of gateway program 116. At block 402, gateway program 116 receives gateway copybook 114 in response to a CONNECT signal from gateway interface 110 via a network. At block 404, gateway program 116 prepares the gateway copybook for transmission to proxy web service 120. For instance, in the embodiment of a CICS server, a PUT CONTAINER operation is used to provide the request structure to the transaction server. At block 406, gateway program 116 invokes the proxy web service, such as, again the embodiment of a CICS server, using the INVOKE WEBSERVICE operation. At block 408, gateway program 116 receives response data from proxy server 120. Again in the embodiment of a CICS transaction server, the operation GET CONTAINER SET may be utilized to point at response data. At block 410, gateway program 116 updates the received gateway copybook including batch count statistics (for batch mode operations) and data regarding response times such as request, maximum, and accumulated requests. At block 412, gateway program 116 sends updated gateway copybook 114, including target web service response data, to gateway interface 110 via the network. The method may include additional, less, or alternate functionality, including that discussed elsewhere herein.

V. Exemplary Proxy Web Service Operation

Figure 5:
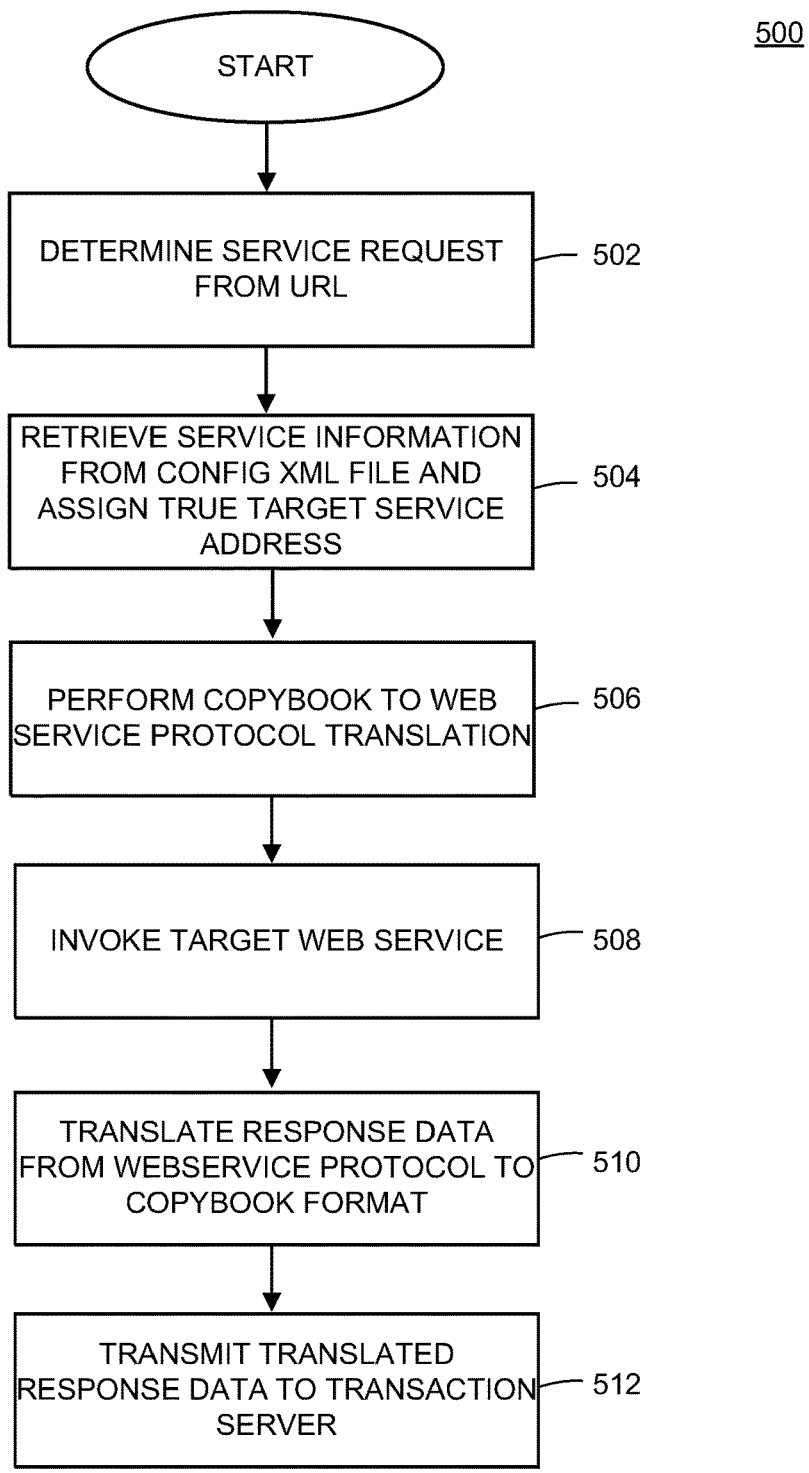
FIG. 5 is a flow chart illustrating a method of operating a proxy web service in accordance with the present embodiments.

FIG. 5 illustrates a method 500 of operating proxy web service 120. At block 502, proxy web service 120 determines the request to target web service 102 based upon URL request received from gateway program 116 in block 406. At block 504, proxy web service 120 retrieves service information from configuration XML file. At block 506, data translation service 122 on proxy web service 120 performs a translation of request data from copybook format to web service protocol format. At block 508, proxy web service 120 invokes target web service 102 via an HTTP request over public or private network 106. At block 510, data translation service 122 on proxy web service 120 performs a translation of response web protocol data into copybook format. At block 512, proxy web service 120 responds to INVOKE WEBSERVICE operation made by gateway program 116 at block 406. The method may include additional, less, or alternate functionality, including that discussed elsewhere herein.

VI. Exemplary Gateway Copybook

Figure 6:
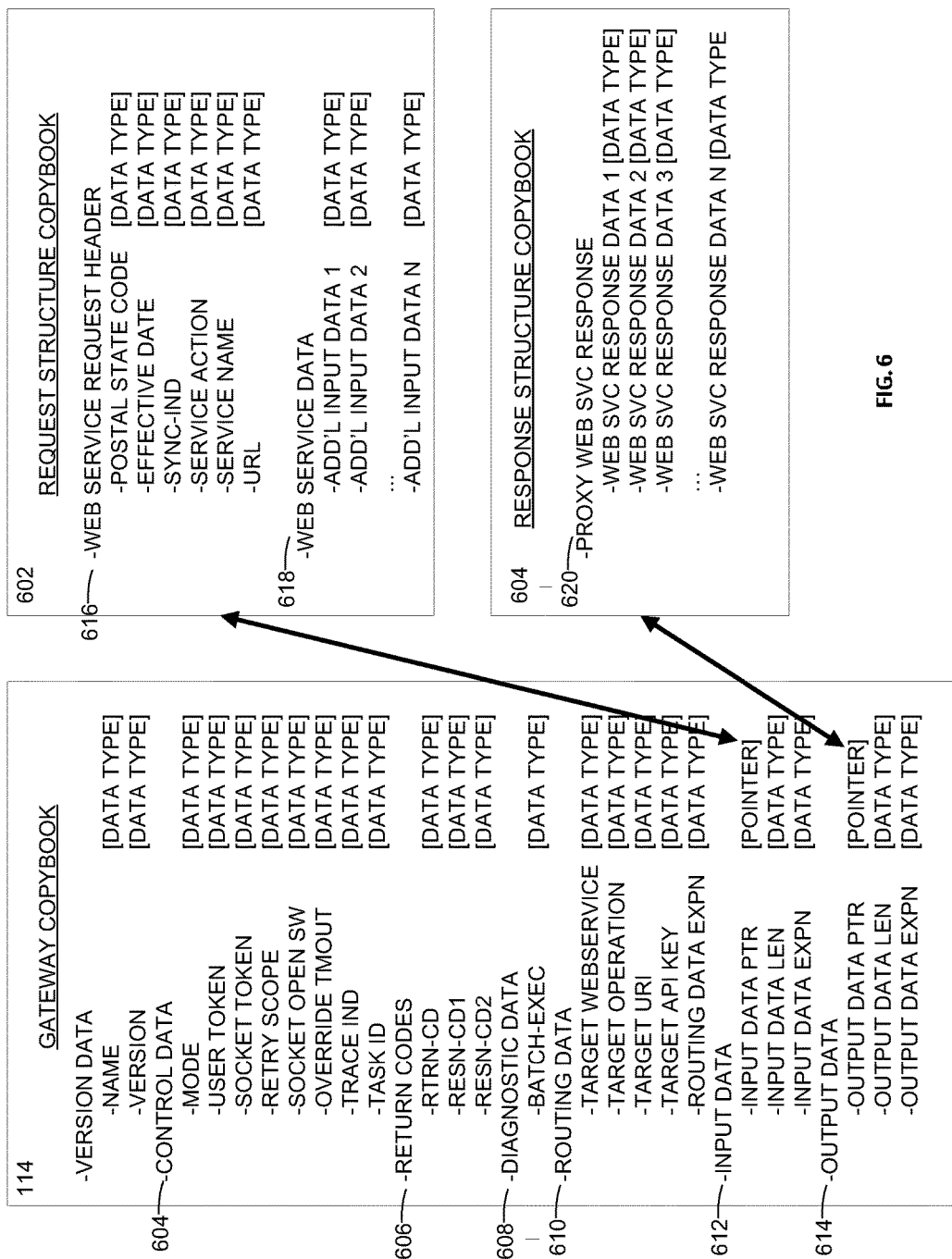
FIG. 6 is a diagram of sample gateway, request structure, and response structure copybooks.

FIG. 6 illustrates an exemplary gateway copybook 114, with pointers to request structure 602 and response structure 604. Gateway copybook 114 contains records with typed variables to enable host application(s) 112 to communicate with web service gateway 100, including the submission of request data, the receiving of response data, and the submission of parameters to control the operation and behavior of the web service gateway 100. Host application(s) 112 also receive error codes via gateway copybook 114 for display in message area 124.

Referring now to gateway copybook 114 as illustrated in FIG. 6, the data is organized in this embodiment by records grouped into the various functional areas. For example, record CONTROL DATA 604 contains sub records for specifying the mode of the request (online or batch), tokens for the user and socket communications, a retry scope parameter to instruct the web service gateway 100 regarding how many times connections should be attempted, among any other parameters that would control desirable behavior of the gateway. Record RETURN CODES 606 defines the various return codes available for display in message area 124. Record DIAGNOSTIC DATA 608 identifies data relating to the performance of web service gateway 100. Record ROUTING DATA 610 defines the parameters needed to access target web service 102 including its Uniform Resource Locator, the desired service name, the desired target operation, an API key if needed, and routing data. Record INPUT DATA 612 contains a pointer to request structure copybook 602 to house the parameters to be submitted to target web service 102, including the length of the structure. Record OUTPUTDATA 614 similarly contains a pointer to response structure copybook 604, including the length of the structure. Referring now to request structure copybook 602, there is illustrated record WEB SERVICE REQUEST HEADER 616 containing elements of the HTTP request. Record WEB SERVICE DATA 618 contains further additional input data for the request to target web service 102. Response structure copybook 604 likewise contains data record PROXY WEB SVC RESPONSE 620 to provide data elements for the response from target web service 102. The method may include additional, less, or alternate functionality, including that discussed elsewhere herein.

VII. Exemplary Data Translation Service

Referring now to FIG. 7, there is illustrated an embodiment of data translation service 122 on web server 126. Gateway program 116 transmits data container 702 containing information from gateway copybook 114 and request structure copybook 602 to web server 126. Data translation service 122 on web server 126 extracts target web service request data and formats it into web service protocol format 704. The illustrated example is using SOAP web protocol, but persons skilled in the art will recognize that any web service protocol may be used, as appropriate. Data translation service 122 further transforms response data 708 from target web service 102 from web service protocol to container format 706 for transmission to gateway program 116. Persons skilled in the art will recognize that any web protocol may be used in this step.

While the present embodiments have been described with reference to certain preferred embodiments, those skilled in the art will recognize particular aspects of the invention. For example, in one aspect a computer-implemented web service gateway system may be provided. The system may include a memory; a host application execution environment; and a gateway interface configured to receive a host application input to select a target web service via a gateway copybook. The gateway interface may be further configured to receive a host application input to select a target web function via the gateway copybook. The system may further include a gateway program configured to invoke a proxy web service with a request including data derived from the gateway copybook. The proxy web service may be configured to map data from the gateway copybook to web protocol format data; and to invoke a target web service with the web protocol format data. The proxy web service may be configured to map or translate response data from the target web service into gateway copybook format or into a transaction server container format. The system may include additional, fewer, or alternate components and/or functionality, including that disclosed elsewhere herein.

VIII. Exemplary Web Service Gateway System

In one aspect, a computer-implemented web service gateway system may be provided. The system may include: (1) a memory; (2) a host application execution environment; and (3) a gateway interface configured to receive a host application input to select a target web service via a gateway copybook. The gateway interface may be configured to receive a host application input to select a target web service via a gateway copybook, and further configured to receive a host application input to select a target web function via the gateway copybook. The gateway program may be configured to invoke a proxy web service with a request including data derived from the gateway copybook. The system may include additional, less, or alternate functionality, including that discussed elsewhere herein.

For instance, the proxy web service may be configured to: (i) map data from the gateway copybook to web protocol format data; (ii) invoke a target web service with the web protocol format data; (iii) map response data from the target web service into gateway copybook data format; (iv) transmit mapped response data to the transaction server; and/or (v) retrieve service information from a configuration Extensible Markup Language file.

The transaction server may be configured to: (a) store gateway copybook data in a container; (b) receive response data from the proxy web service; (c) update the gateway copybook with information received from the target web service; (d) update the gateway copybook with metadata relating to information received from the target web service; (e) transmit response data from the target web service to the gateway interface; (f) transmit response data from the target web service to the host application; and/or (g) identify the host application execution system. The gateway interface may be configured to: update the gateway copybook with transaction server connection information based upon an identification of the local network topology of the identified host application execution system; and/or receive the gateway copybook containing response data from the target web service from the transaction server. The host application may comprise a message viewing area, and the host application execution environment may be the transaction server.

IX. Exemplary Gateway Copybook

In one aspect, a gateway copybook for transmitting web service client requests may be provided. The gateway copybook may include: (1) one or more data sets comprising typed variables that may include one or more of control data, return codes, diagnostic data, and routing data; (2) a request structure copybook pointer that may identify a memory location where a request structure copybook resides and/or comprises target web service client request parameters; and/or (3) a response structure copybook pointer that may identify a memory location where a response structure copybook resides and comprises target web service client response data. The gateway copybook may include additional, less, or alternate functionality, including that discussed elsewhere herein.

X. Exemplary Method

In one aspect, a computer-implemented method for managing host application web service client requests may be provided. The method may include natively calling a gateway interface from a host application; submitting target web service request data via a gateway copybook to a gateway interface; transferring the gateway copybook to a gateway program executing on a transaction server; storing the target web service data in one or more containers; transmitting the one or more containers to a proxy web service; mapping the target web service data in the one or more containers into web service protocol format; and/or submitting target web service request data according to the web service protocol format to the target web service to facilitate managing host application web service client requests. The computer-implemented method may include additional, fewer, or alternate actions, including those discussed elsewhere herein.

For instance, the method may include: (i) receiving response data from the target web service; (ii) receiving response data from a proxy web service; (iii) mapping the response data from the target web service into gateway copybook format; (iv) transmitting mapped response data to a transaction server; (v) retrieving service information from a configuration Extensible Markup Language file; (vi) updating the gateway copybook with information received from the target web service; updating the gateway copybook with information received from the target web service with metadata; (vii) transmitting response data from the target web service to the gateway interface; and/or (viii) transmitting response data from the target web service to the host application. Additionally or alternatively, the method may include (ix) identifying the host application execution system; (x) updating the gateway copybook with transaction server connection information based upon an identification of the local network topology of the identified host application execution system; and/or (xi) receiving the gateway copybook containing response data from the target web service from the transaction server.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention. Also, this detailed description is to be construed as examples and does not describe every possible embodiment, as describing every possible embodiment would be impractical, if not impossible. One could implement numerous alternate embodiments, using either current technology or technology developed after the filing date of this application.

The invention claimed is:

1. A computer-implemented web service gateway system comprising:
a host application execution environment including one or more processors, a memory configured to store and execute one or more host applications, and a gateway interface configured to receive a gateway copybook input from one of the host applications, the gateway copybook including at least:
input data including a pointer identifying a memory location where a request structure copybook resides; and
output data including a pointer identifying a memory location where a response structure copybook resides;
wherein a gateway program is configured to receive the gateway copybook from the gateway interface via a network and to invoke a proxy web service with a request using the request structure copybook, the proxy web service being configured to map data from the request structure copybook to web protocol format data;
wherein the proxy web service is configured to invoke a target web service with the web protocol format data; and
wherein the gateway program is further configured to return a response to the gateway interface, the response to the gateway interface being based upon a response that (i) the gateway program receives from the proxy web service, and (ii) uses the response structure copybook.

2. The system of claim 1, wherein the proxy web service is further configured to:
map response data from the target web service into a data format of the response structure copybook.

3. The system of claim 1, wherein the proxy web service is further configured to:
transmit mapped response data to a transaction server.

4. The system of claim 3, wherein the transaction server is configured to:
store gateway copybook data in a container.

5. The system of claim 3, wherein the transaction server is configured to:
receive response data from the proxy web service.

6. The system of claim 3, wherein the transaction server is configured to:

update the response structure copybook with information received from the target web service.

7. The system of claim 3, wherein the transaction server is configured to:
update the gateway copybook with metadata relating to information received from the target web service.

8. The system of claim 3, wherein the transaction server is configured to:
transmit response data from the target web service to the gateway interface.

9. The system of claim 3, wherein the gateway interface is further configured to:
receive the gateway copybook containing the pointer identifying a memory location where a response structure copybook resides from the transaction server.

10. The system of claim 3, wherein the host application execution environment is the transaction server.

11. The system of claim 1, wherein the proxy web service is further configured to:
retrieve service information from a configuration Extensible Markup Language file.

12. The system of claim 1, wherein the gateway interface is further configured to:
transmit response data from the target web service to the one of the host applications.

13. The system of claim 1, wherein the gateway interface is further configured to:
identify the host application execution system.

14. The system of claim 13, wherein the gateway interface is further configured to:
update the gateway copybook with transaction server connection information based upon an identification of the local network topology of the identified host application execution system.

15. The system of claim 1, wherein the host application comprises:
a message viewing area.

16. A computer-implemented method for managing host application web service client requests, the method including:
natively calling a gateway interface from a host application;
submitting target web service request data in a request structure copybook to a gateway interface via a pointer in a gateway copybook to the request structure copybook, wherein the gateway copybook includes at least:
input data including the pointer to the request structure copybook, the pointer to the request structure copybook identifying a memory location where the request structure copybook resides; and
output data including a pointer identifying a memory location where a response structure copybook resides;
transferring, via a network, the gateway copybook from the gateway interface to a gateway program executing on a transaction server;
mapping, via a proxy web service, the target web service data into web service protocol format;
submitting target web service request data according to the web service protocol format to a target web service to facilitate managing host application web service client requests; and
returning a response from the gateway program to the gateway interface, the response to the gateway interface being based upon a response that (i) the gateway program receives from the proxy web service, and (ii) uses the response structure codebook.

17. The computer-implemented method of claim 16, further comprising:
receiving response data from the target web service, the response data being according to the web service protocol format; and
mapping the response data from the target web service into response structure copybook format.

18. The computer-implemented method of claim 17, further comprising:
transmitting mapped response data to the transaction server; and
updating the gateway copybook with information received from the target web service, wherein updating the gateway copybook with information received from the target web service includes updating the gateway copybook with metadata.

19. The computer-implemented method of claim 18, further comprising:
identifying a host application execution system; and
updating the gateway copybook with transaction server connection information based upon an identification of a local network topology of the identified host application execution system.

20. The computer-implemented method of claim 18, further comprising:
identifying a host application execution system; and
updating the gateway copybook with transaction server connection information based upon an identification of a local network topology of the identified host application execution system.

* * * * *